(12) United States Patent
Ni et al.

(10) Patent No.: US 9,677,559 B2
(45) Date of Patent: Jun. 13, 2017

(54) BEARING FACE GEOMETRY FOR GEAR PUMP

(75) Inventors: Weishun Ni, Rockton, IL (US); Satish Shantilal Shah, Rockford, IL (US); Timothy P. Walgren, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1756 days.

(21) Appl. No.: 13/034,864

(22) Filed: Feb. 25, 2011

(65) Prior Publication Data

US 2012/0219449 A1  Aug. 30, 2012

(51) Int. Cl.
F04C 2/18 (2006.01)

(52) U.S. Cl.
CPC ........ *F04C 2/18* (2013.01); *F04C 2210/1044* (2013.01); *F04C 2240/56* (2013.01); *F16C 2360/42* (2013.01); *Y10T 29/49236* (2015.01)

(58) Field of Classification Search
USPC .............................. 418/205, 206.8, 180, 189
See application file for complete search history.

(56) References Cited

U.S. PATENT DOCUMENTS

| | | | |
|---|---|---|---|
| 1,902,346 A | | 3/1933 | Vogt |
| 2,301,496 A | | 11/1942 | Aldrich |
| 2,884,864 A | * | 5/1959 | Bobnar .................. 418/189 |
| 3,003,426 A | * | 10/1961 | Lauck .................... 418/180 |
| 3,018,641 A | | 1/1962 | Carpigiani |
| 3,045,778 A | | 7/1962 | Mosbacher |
| 3,182,596 A | | 5/1965 | Prijatel |
| 3,435,773 A | | 4/1969 | Gustafsson |
| 3,824,041 A | | 7/1974 | Rystrom |
| 3,833,317 A | | 9/1974 | Rumsey |
| 3,953,160 A | | 4/1976 | Bottoms |
| 4,097,206 A | | 6/1978 | Schonherr |
| 4,290,739 A | | 9/1981 | Korse |
| 4,631,009 A | | 12/1986 | Cygnor et al. |
| 5,004,407 A | | 4/1991 | Hutchison |
| 5,071,328 A | | 12/1991 | Schlictig |
| 5,586,875 A | | 12/1996 | Ondrejko et al. |
| 6,042,352 A | * | 3/2000 | Halter et al. ................. 418/189 |
| 6,135,741 A | | 10/2000 | Oehman, Jr. |
| 6,138,646 A | | 10/2000 | Hansen et al. |
| 6,223,775 B1 | | 5/2001 | Hansen et al. |
| 6,241,498 B1 | | 6/2001 | Hansen et al. |
| 6,321,527 B1 | | 11/2001 | Dyer et al. |
| 6,705,847 B1 | | 3/2004 | Sagawe et al. |
| 7,094,042 B1 | | 8/2006 | Borgetti et al. |
| 7,878,781 B2 | | 2/2011 | Elder |
| 2002/0061256 A1 | | 5/2002 | Hansen et al. |
| 2006/0024188 A1 | | 2/2006 | Muscarella et al. |
| 2007/0178003 A1 | | 8/2007 | Zhu et al. |
| 2009/0148333 A1 | | 6/2009 | Elder |

OTHER PUBLICATIONS

Fundamentals of Gearing, www.xtek.com/pdf/wp-gear-terminology.pdf, saved 7 times between Jan. 14, 2006 and Nov. 1, 2013, pp. 1-4 (p. 5 is the wayback archieve to determine the date of the webpage).*
CN Search Report for CN201210043605.X mailed May 15, 2014.

* cited by examiner

*Primary Examiner* — Mary A Davis
(74) *Attorney, Agent, or Firm* — Carlson, Gaskey & Olds, P.C.

(57) ABSTRACT

A bearing includes a bridge land geometry having a finger cut that defines a width ISW, a center of the width ISW displaced from a shaft axis a radial distance ISR, a ratio of ISW/ISR between 0.074-0.293, to reduce cavitation and pressure ripple.

23 Claims, 14 Drawing Sheets

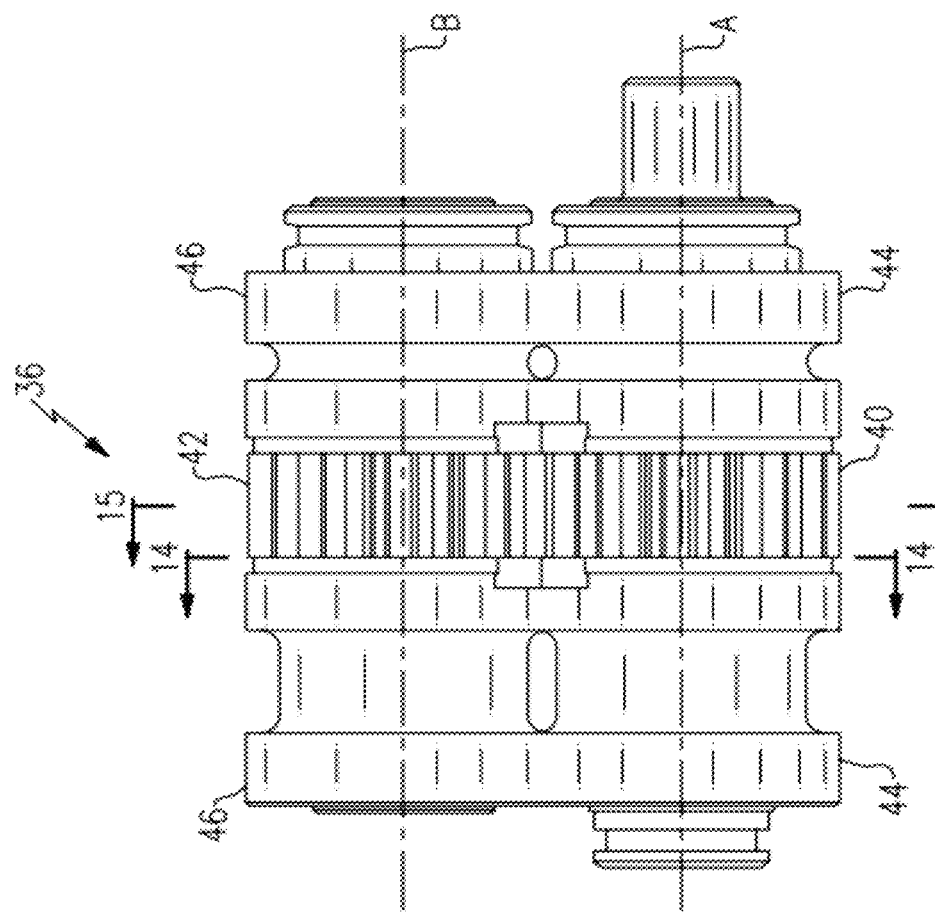
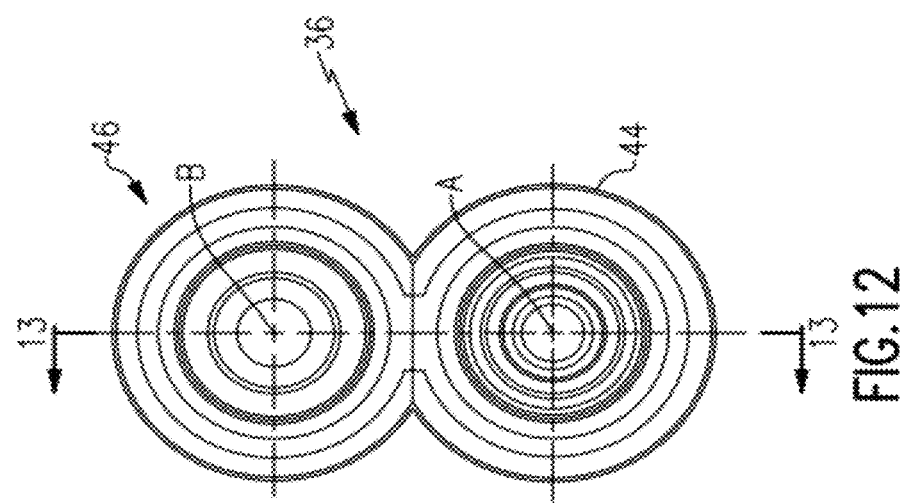

BEARING FACE GEOMETRY FOR GEAR PUMP

BACKGROUND

The present disclosure relates to a pump, and more particularly to a fuel gear pump for gas turbine engines.

Fuel gear pumps are commonly used to provide fuel flow and pressure for gas turbine engines and other systems on aircrafts. The gear pump must perform over a wide system operating range and provide critical flows and pressures for various functions. Typically, these pumps receive rotational power from an accessory gearbox through a drive shaft.

In a dual gear stage pump rotational power is transferred from one gear stage to the other gear stage through an input shaft and coupling shaft. Each gear stage includes gears supported by bearings. Among other features the bearings provide, gear bearing face geometry minimizes cavitation and pressure ripple which may deteriorate pump components.

SUMMARY

A bearing according to an exemplary aspect of the present disclosure includes a bridge land geometry having a finger cut that defines a width ISW, a center of the width ISW displaced from an axis a radial distance ISR, a ratio of ISW/ISR between 0.074-0.293.

A gear pump according to an exemplary aspect of the present disclosure includes a first shaft which extends along a first axis, a first gear mounted to the shaft along the first axis and a first bearing which supports the first gear, the first bearing having a first bridge land geometry with a finger cut that defines a width ISW, a center of the width ISW displaced from the first axis a radial distance ISR, a ratio of ISW/ISR between 0.074-0.293.

A method of installing a gear within a gear pump according to an exemplary aspect of the present disclosure includes supporting a first gear with a first bearing along an axis, the first bearing having a first bridge land geometry with a finger cut that defines a width ISW, a center of the width ISW displaced from the axis a radial distance ISR, a ratio of ISW/ISR between 0.074-0.293.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 11 is an expanded side view of a main stage of the gear pump;

FIG. 12 is an end view of the main stage of FIG. 11;

DETAILED DESCRIPTION

Figure 1:
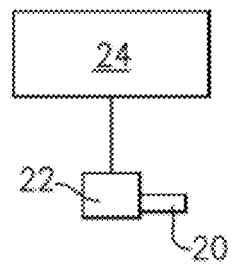
FIG. 1 is a block diagram of a gear pump driven by an accessory gearbox to communicate a fluid such as fuel to a gas turbine.

FIG. 1 schematically illustrates a gear pump 20 driven by an accessory gearbox 22 to communicate a fluid such as fuel to a gas turbine 24. It should be appreciated that the present application is not limited to use in conjunction with a specific system. Thus, although the present application is, for convenience of explanation, depicted and described as being implemented in an aircraft fuel pump, it should be appreciated that it can be implemented in numerous other fluid systems. In addition, although a dual stage gear pump is disclosed, other machines will also benefit herefrom.

Figure 2:
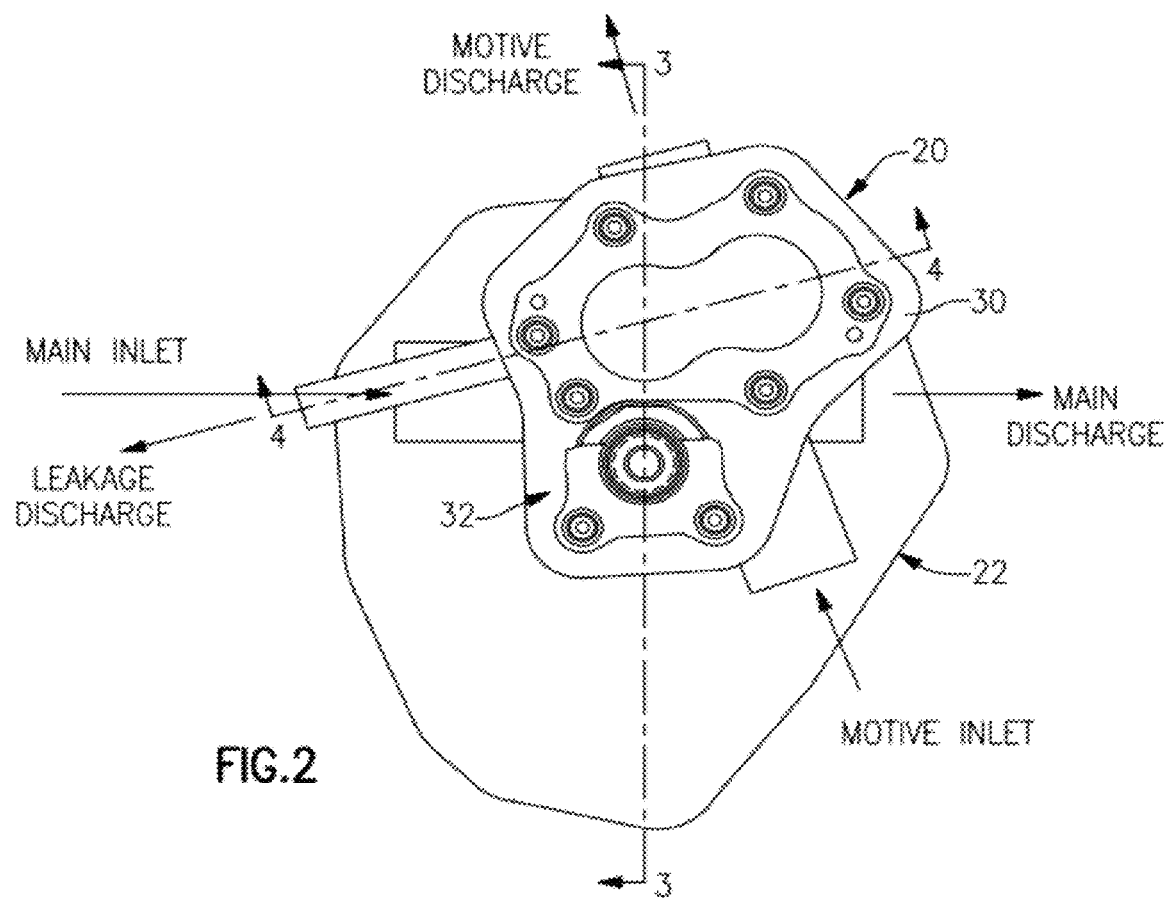
FIG. 2 is an end view of a gear pump.
Figure 3:
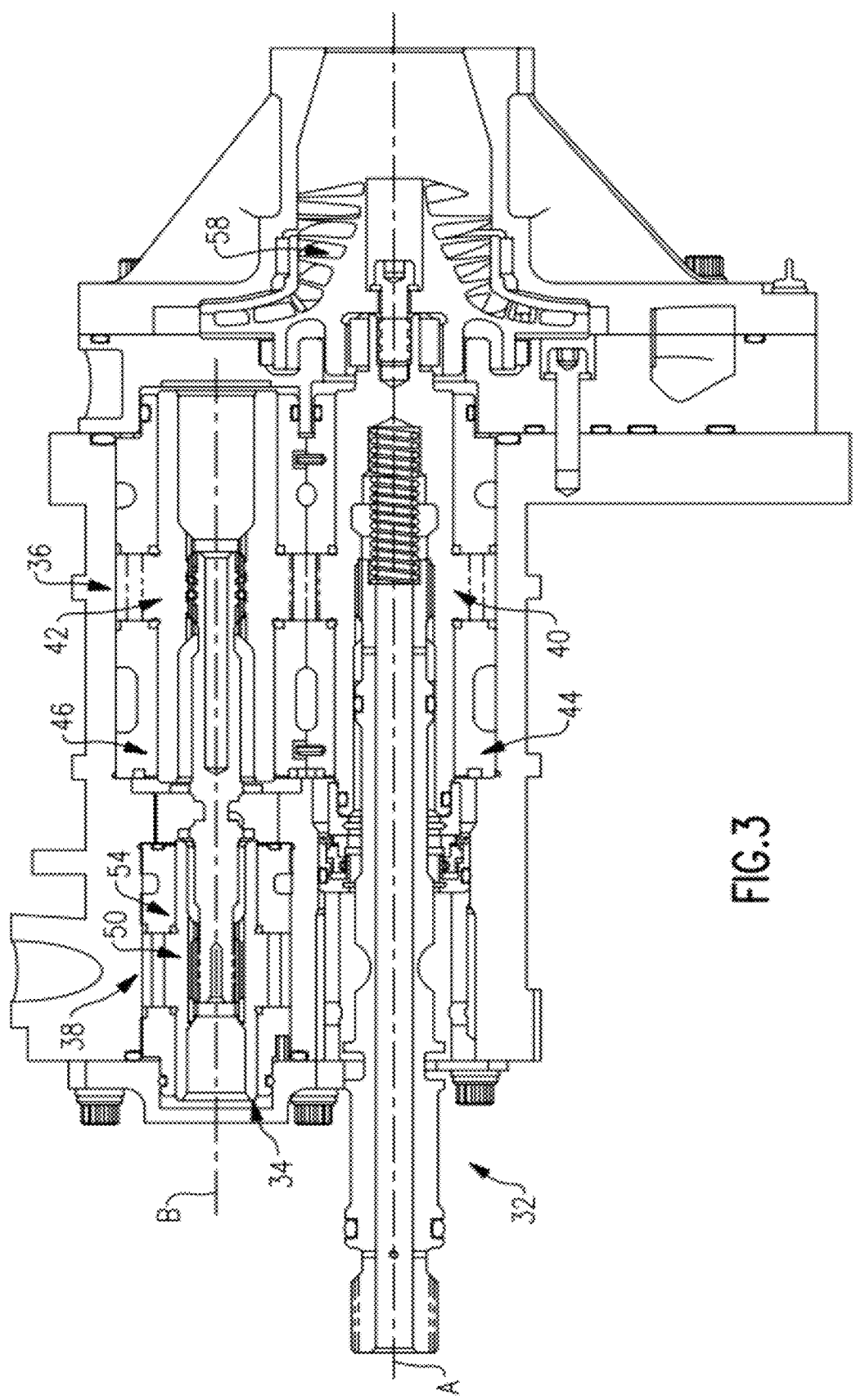
FIG. 3 is a sectional view of the gear pump taken along line 3-3 in FIG. 2.
Figure 4:
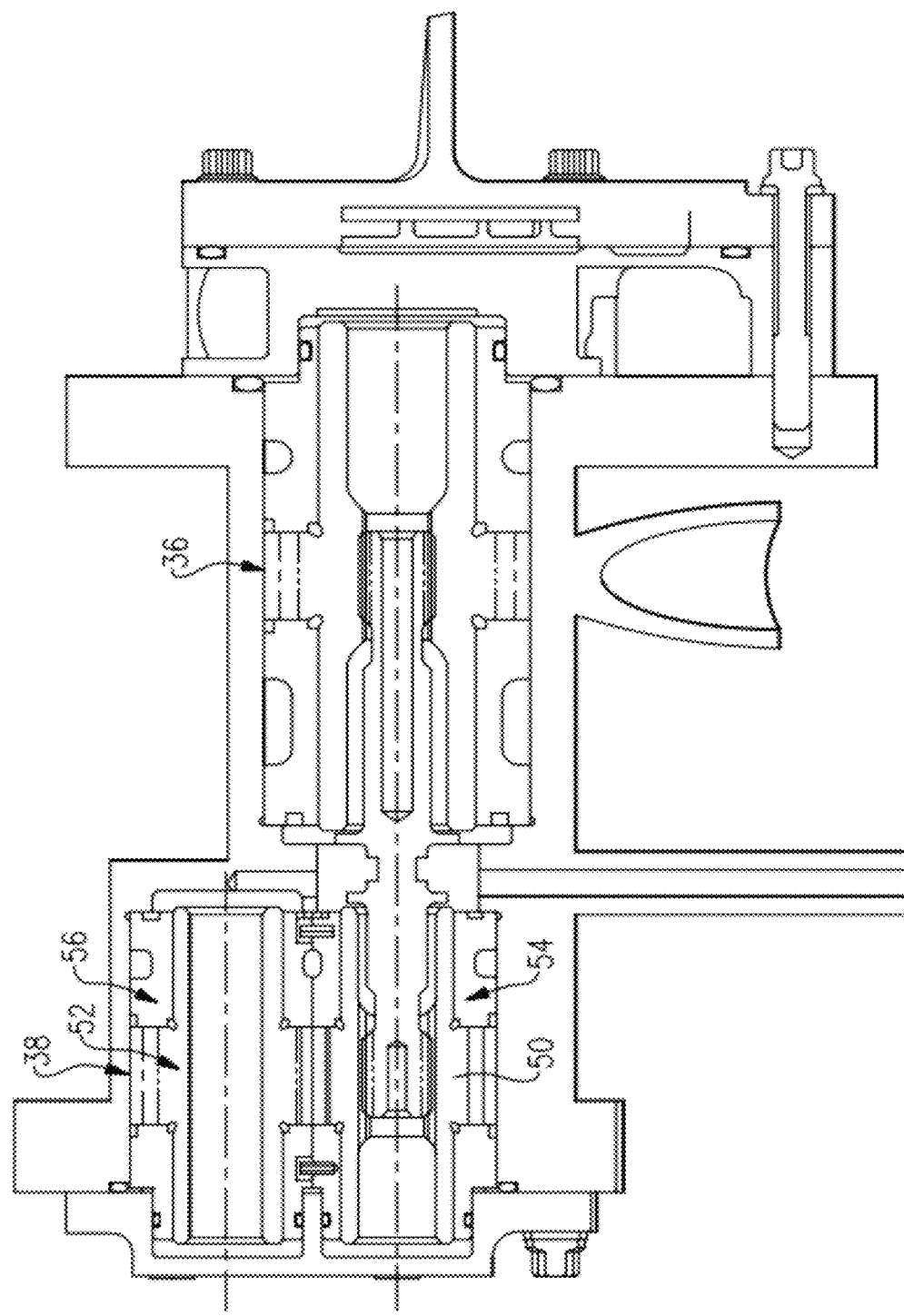
FIG. 4 is a sectional view of the gear pump taken along line 4-4 in FIG. 2.

With reference to FIG. 2, the gear pump 20 generally includes a housing 30 that includes an input shaft assembly 32 and a coupling shaft assembly 34 to power a main stage 36 and a motive stage 38 (FIGS. 3 and 4). Rotational power is transferred from the gas turbine 24 to the accessory gearbox 22 then to the gear pump 20 through the input shaft assembly 32. In the disclosed, non-limiting embodiment, the input shaft assembly 32 interfaces with the accessory gearbox 22 and receives a lubricant therefrom while the coupling shaft assembly 34 is lubricated with fuel.

With reference to FIG. 3, the input shaft assembly 32 is defined along an input shaft axis A and the coupling shaft assembly 34 is defined along a coupling shaft axis B parallel to the input shaft axis A. The main stage 36 generally includes a main drive gear 40, a main driven gear 42, a main drive bearing 44 and a main driven bearing 46. The motive stage 38 generally includes a motive drive gear 50, a motive driven gear 52, a motive drive bearing 54 and a motive driven bearing 56 (FIG. 4).

Figure 5:
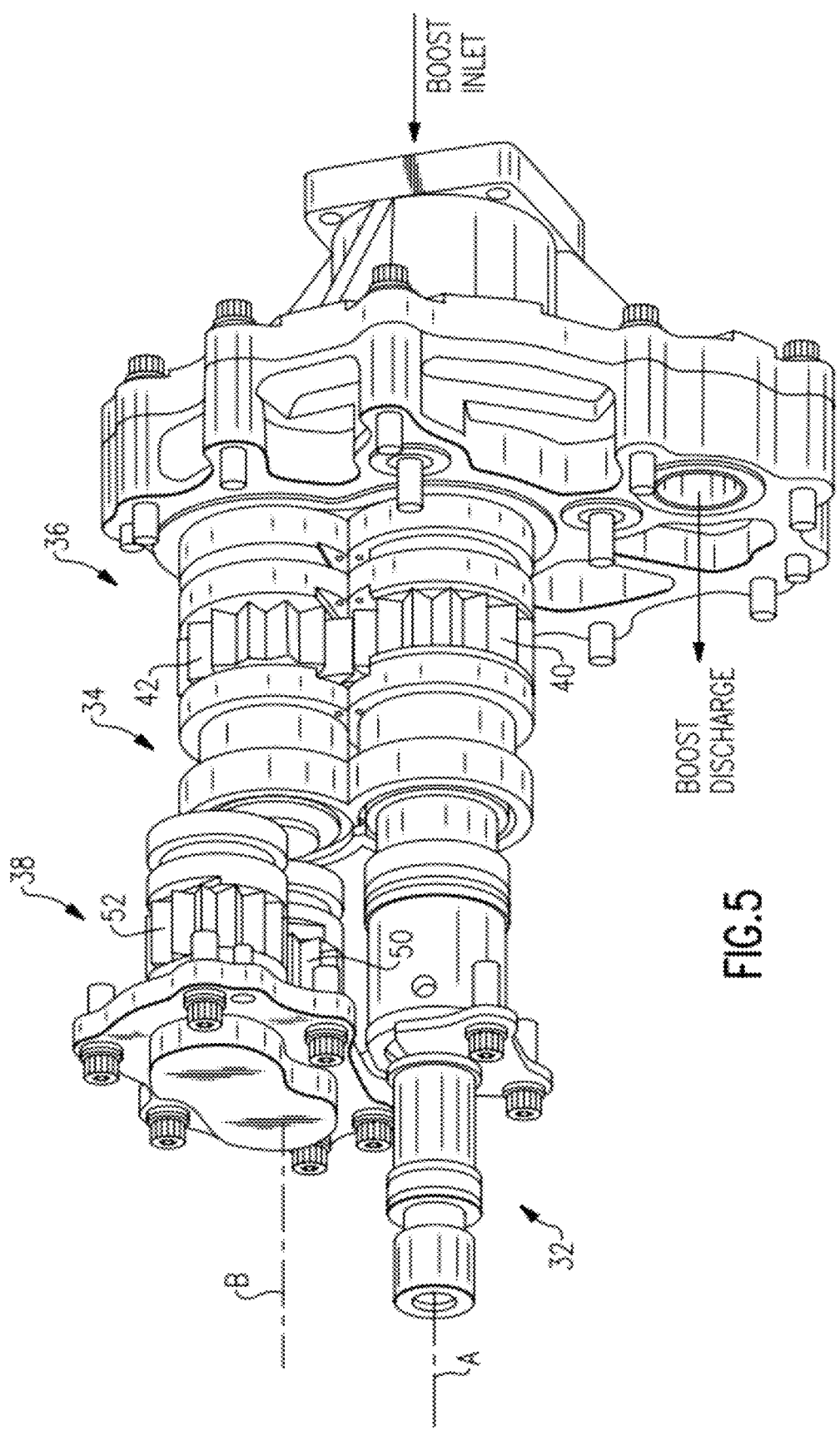
FIG. 5 is a perspective view of the gear pump with the housing removed.
Figure 6:
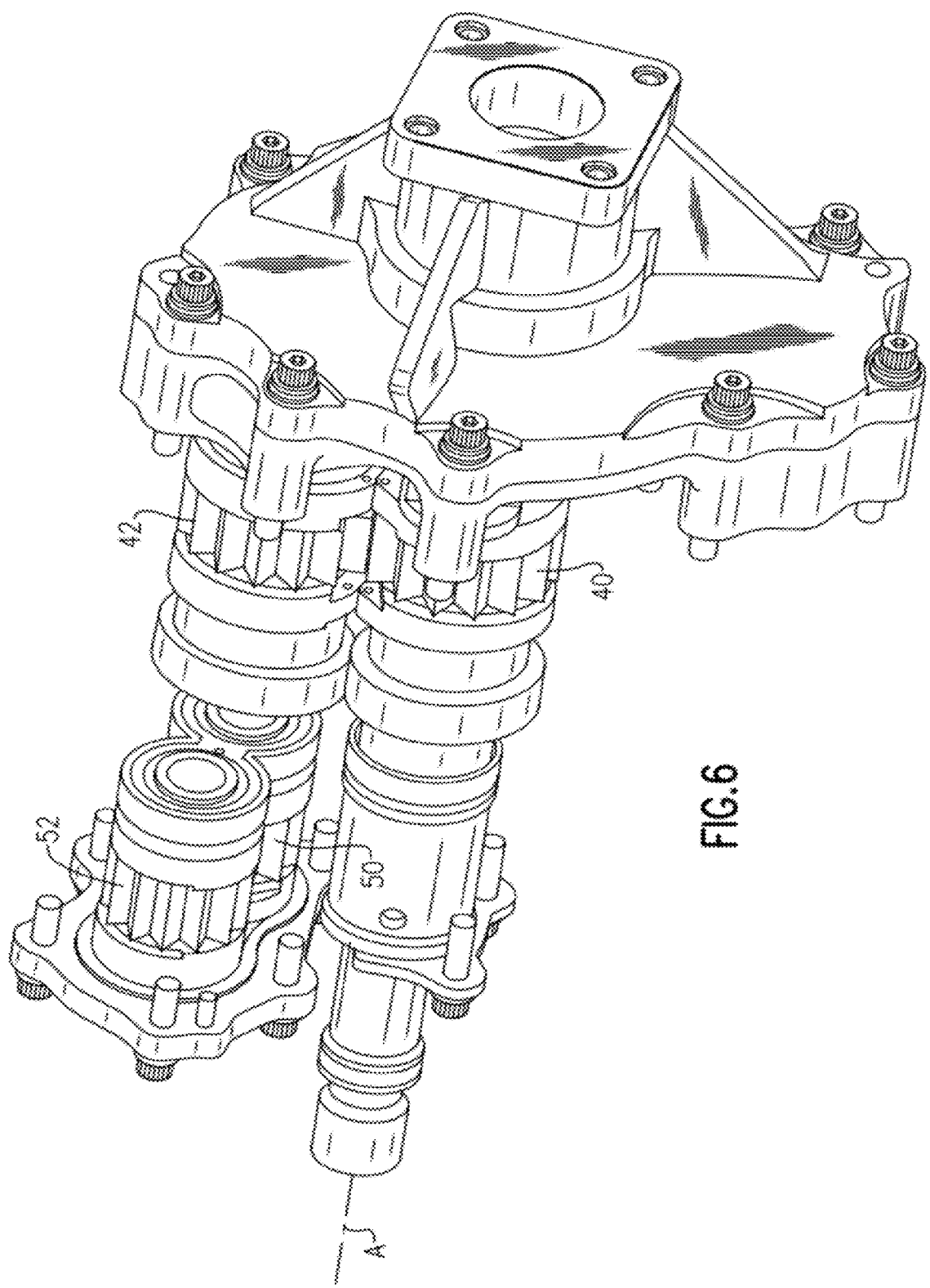
FIG. 6 is another perspective view of the gear pump with the housing removed.
Figure 7:
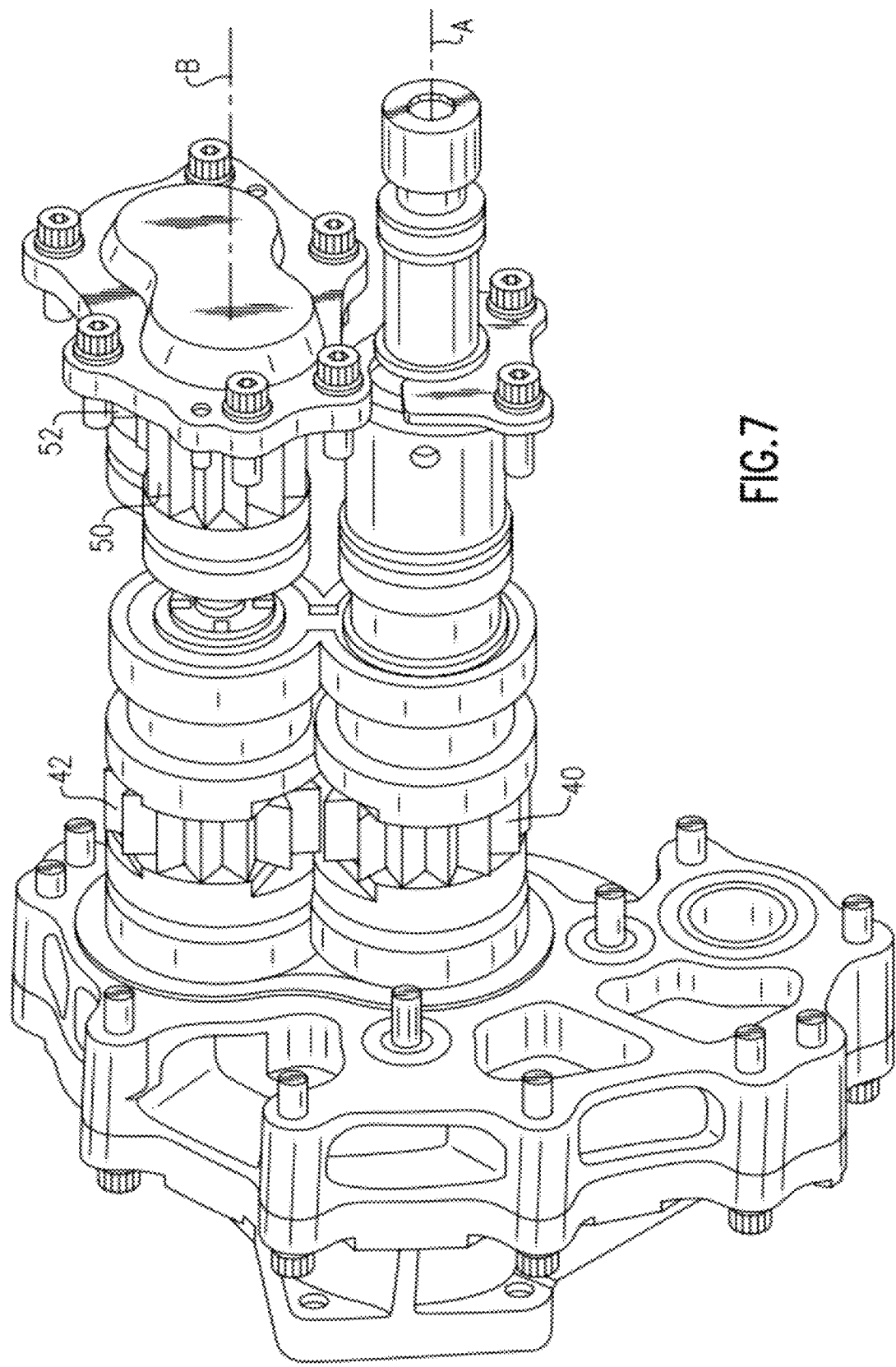
FIG. 7 is another perspective view of the gear pump with the housing removed.

The main drive gear 40 is in meshed engagement with the main driven gear 42 and the motive drive gear 50 is in meshed engagement with the motive driven gear 52 (FIGS. 5-7). The input shaft assembly 32 drives the coupling shaft assembly 34 through the main stage 36 to drive the motive stage 38. A boost stage 58 is also driven by the input shaft assembly 32 to define a centrifugal pump with an impeller and integrated inducer.

Figure 8:
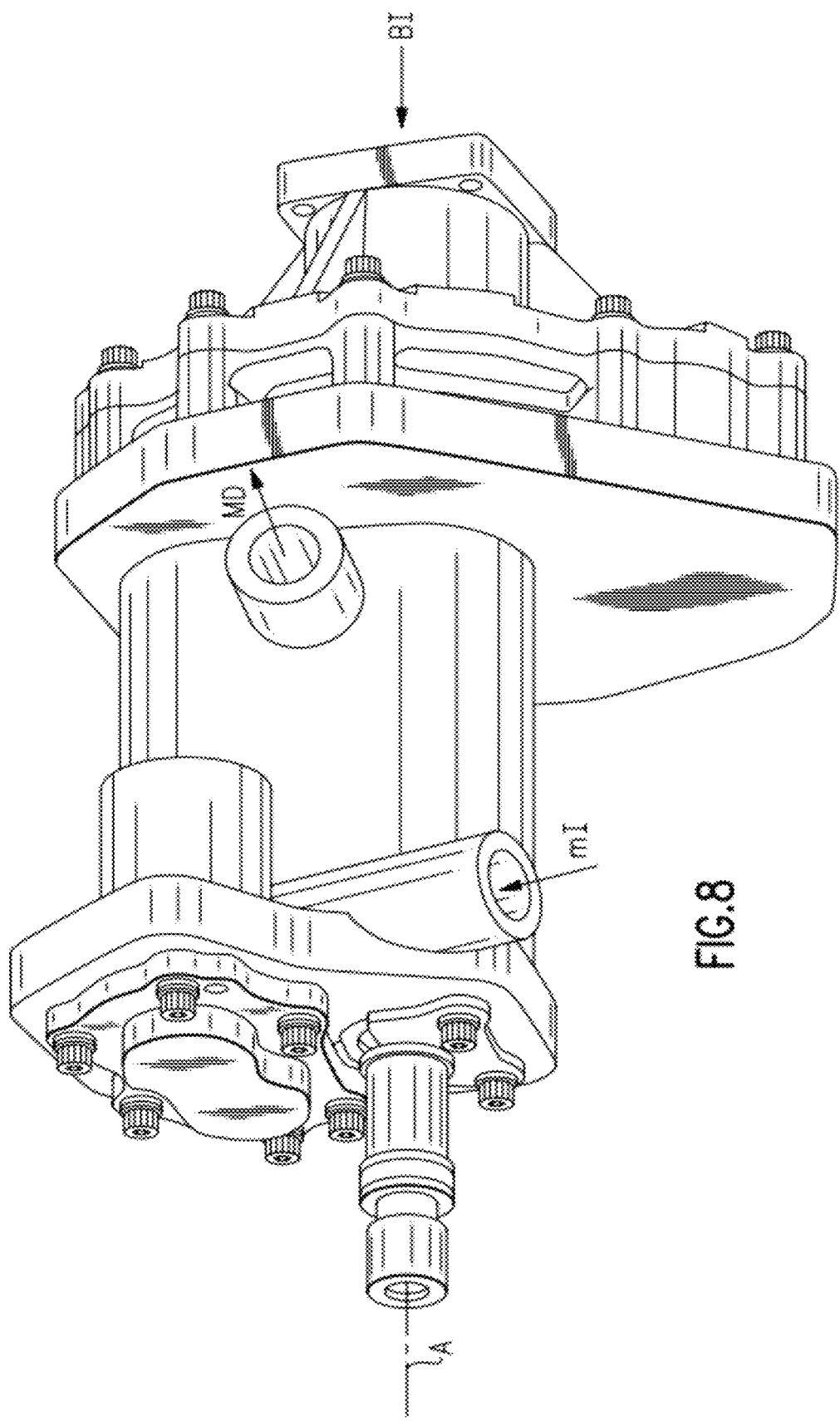
FIG. 8 is a perspective view of the gear pump from the same perspective as in FIG. 5.
Figure 9:
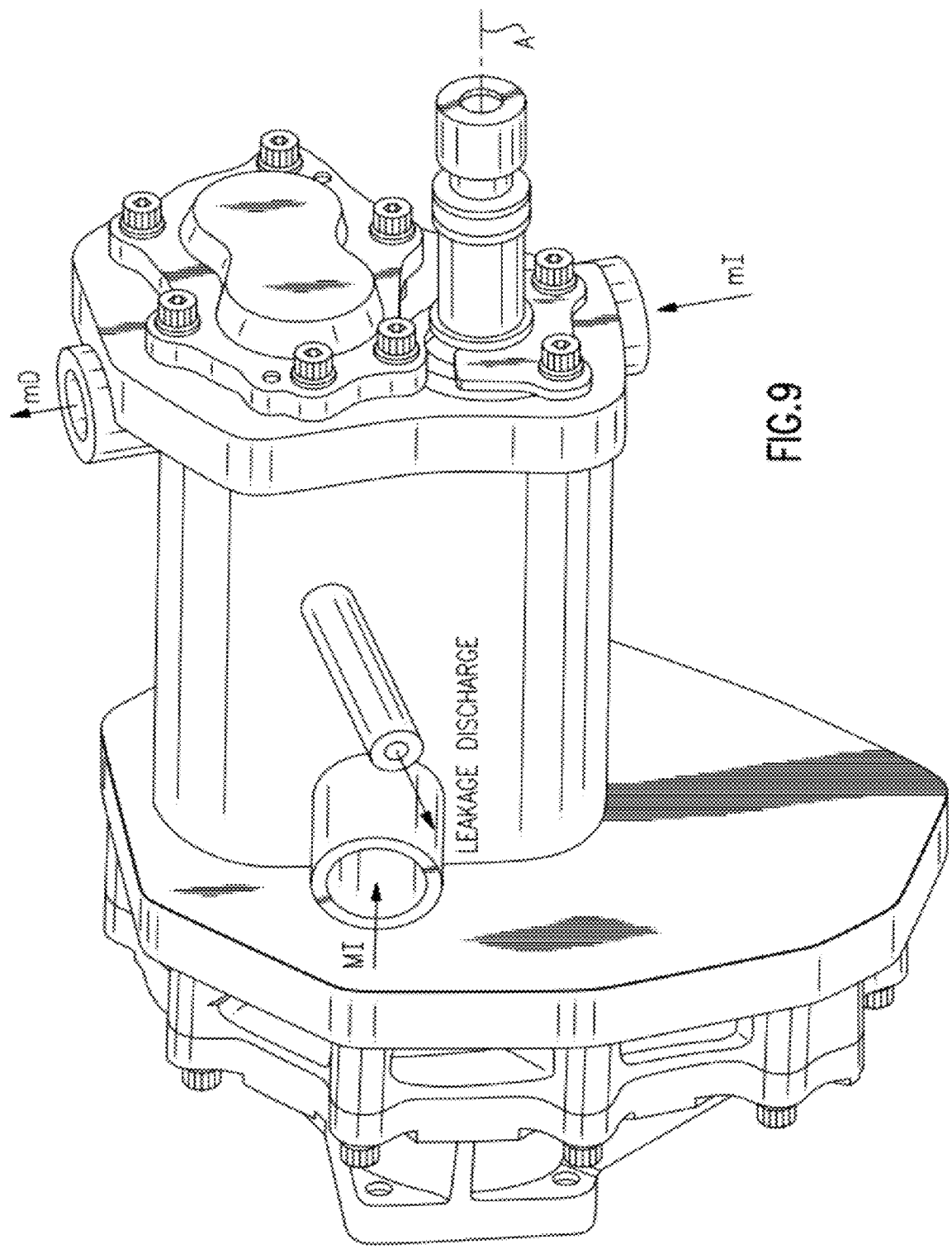
FIG. 9 is a perspective view of the gear pump from the same perspective as in FIG. 7.
Figure 10:
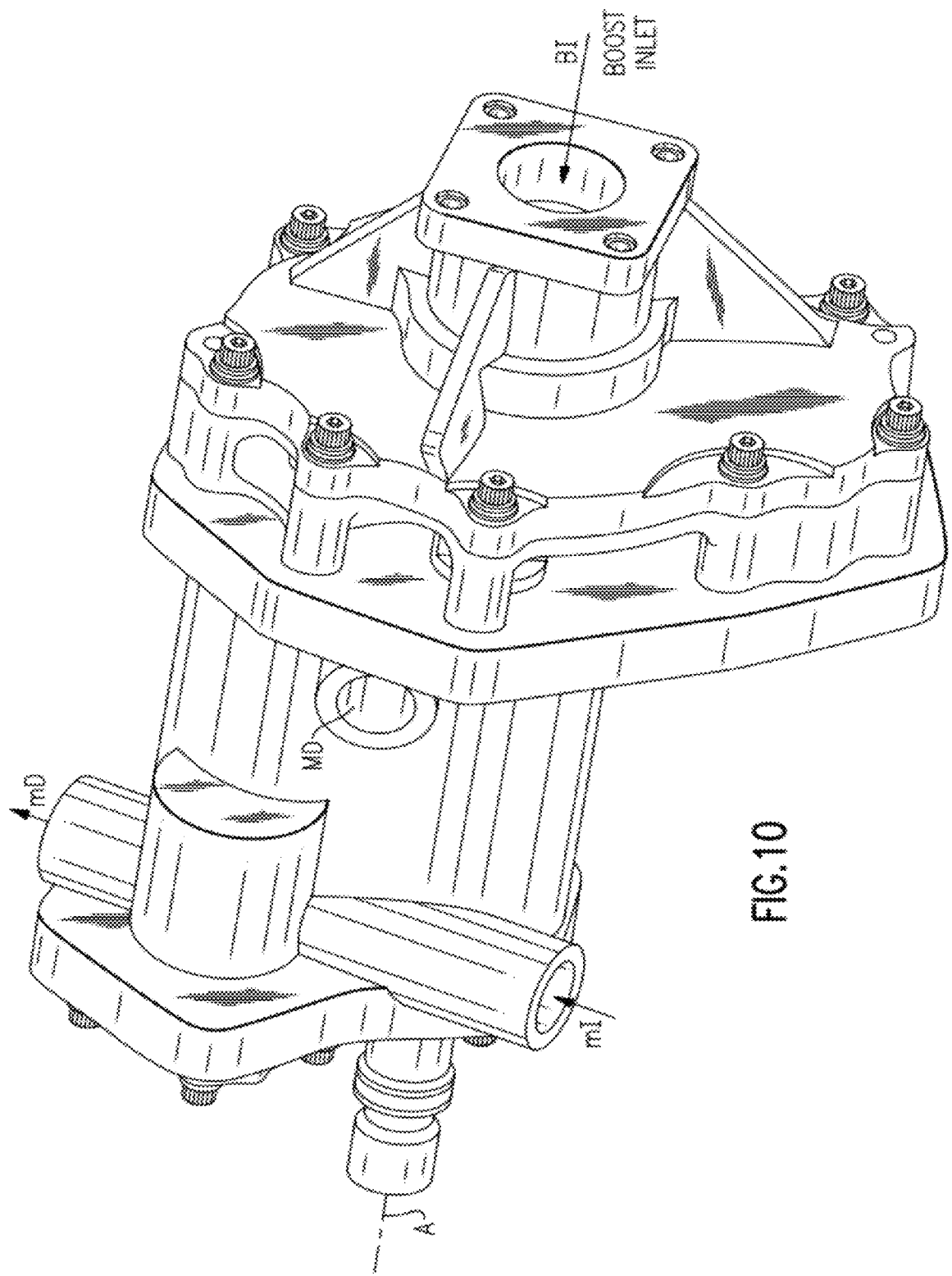
FIG. 10 is a perspective view of the gear pump from the same perspective as in FIG. 6.

The stages 36, 38, 58 work mostly independently. Each stage 36, 38, 58 includes a separate inlet and discharge (FIGS. 8-10). As the meshed gears 40, 42 and 50, 52 rotate, respective volumes of fluid are communicated from the main stage inlet MI to the main stage discharge MD and from a motive stage inlet mI to a motive stage discharge mD such that the main stage 36 communicates a main fuel flow while the motive stage 38 supplies a motive fuel flow. The main stage inlet MI and main stage discharge MD as well as the motive stage inlet mI and motive stage discharge mD are respectively directed along generally linear paths through the respective gear stage 36, 38.

In the disclosed non-limiting embodiment, an aircraft fuel system provides flow and pressure to the boost stage inlet BI. A portion of the boost stage discharge is routed internally to the motive stage inlet mI. The remainder of the boost stage discharge is discharged from the gear pump 20 to the aircraft fuel system, then returns to the main stage inlet MI. The motive stage discharge mD is communicated to the aircraft fuel system. The main stage discharge MD is also communicated to the aircraft fuel system to provide at least two main functions: actuation and engine burn flow. There may be alternative or additional relatively minor flow directions and functions, but detailed description thereof need not be further disclosed herein.

Figure 13:
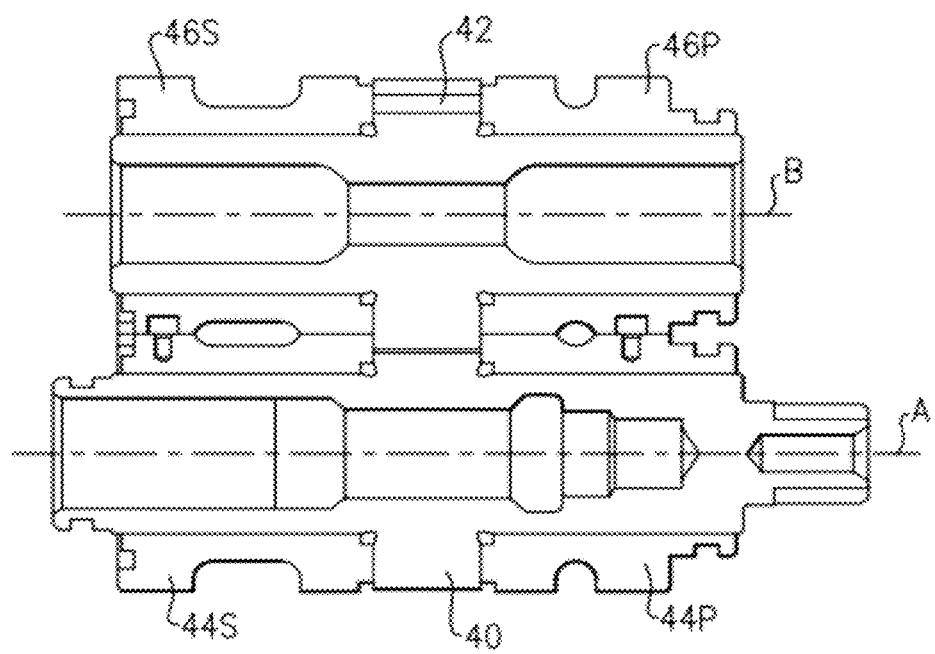
FIG. 13 is a sectional view of the main stage taken along line 13-13 of FIG. 12.

With reference to FIG. 11, the main stage 36 locates the main drive gear 40 and the main driven gear 42 between respective pairs of main drive bearings 44 and main driven bearings 46. The main stage bearings 44, 46 include respective sets of one stationary bearing 44S, 46S and one pressure loaded bearing 44P, 46P (FIG. 13), however the faces (FIG. 14) of each set are adjacent to the respective gears 40, 42 (FIG. 15) which are directly adjacent thereto so as to sandwich the respective gear 40, 42 therebetween.

The main stage bearings 44, 46 on the same side of each of the gears 40, 42 are closely adjacent to one another and are structurally or integrally joined together in a structure resembling a "FIG. 8" when viewed from a direction parallel to the shaft axes A, B. The bearing faces of the main stage bearings 44, 46 mate to the axial end faces of the main stage gears 40, 42. The bearing faces support axial load and contain face geometry near the gear mesh. This face geometry has specific geometric features to direct and seal the fuel flow from the inlet passage into the gears, properly fill the gear teeth pockets as they rotate, and then relieve and direct the fuel flow out of the gear teeth pockets into the discharge passage. Of particular note is the bearing face geometry nearest the gear mesh which is sometimes referred to as the bridge land geometry 60. The main stage inlet MI receives fluid into a main stage bridge land geometry 60 to direct the fluid flow around the gears 40, 42 for discharge through the main stage discharge MD on the other side of the main stage bridge land geometry.

Main Stage Bearing Geometry

Figure 14:
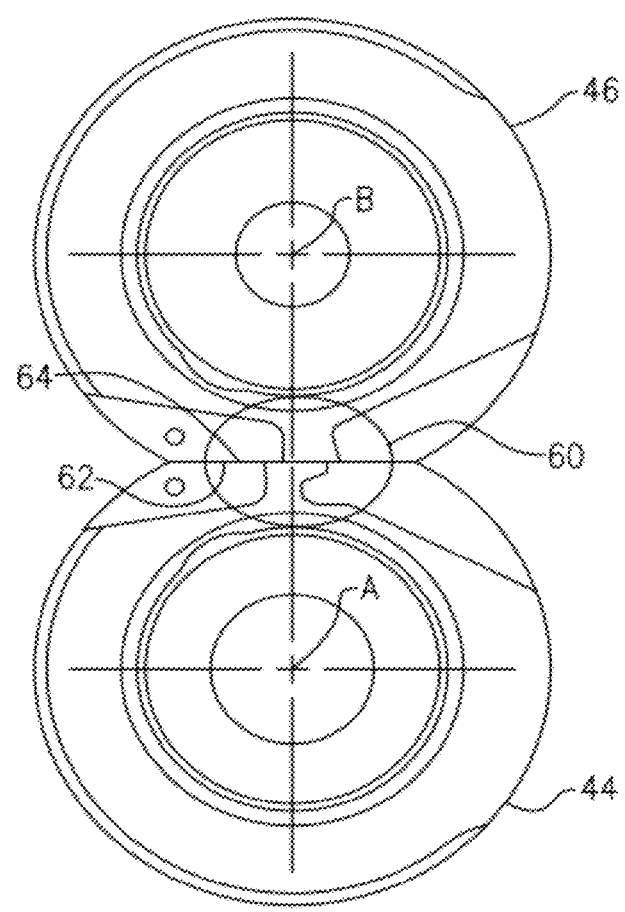
FIG. 14 is a sectional view of the main stage taken along line 14-14 of FIG. 11.
Figure 15:
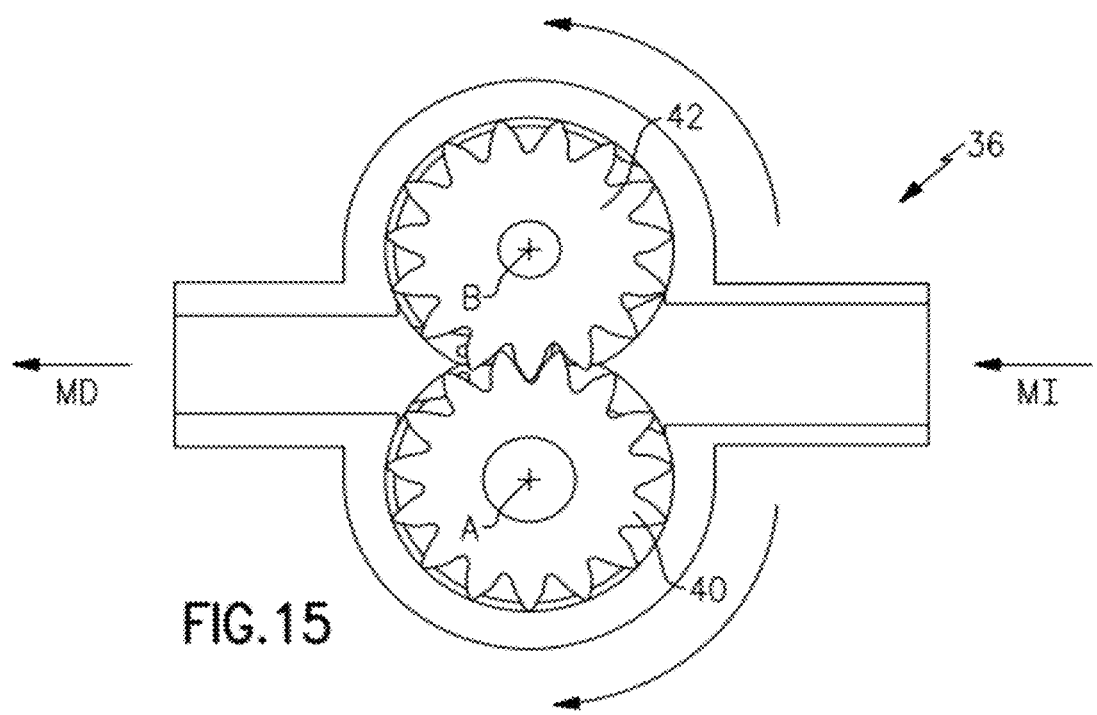
FIG. 15 is a sectional view of the main stage taken along line 15-15 of FIG. 11.
Figure 16:
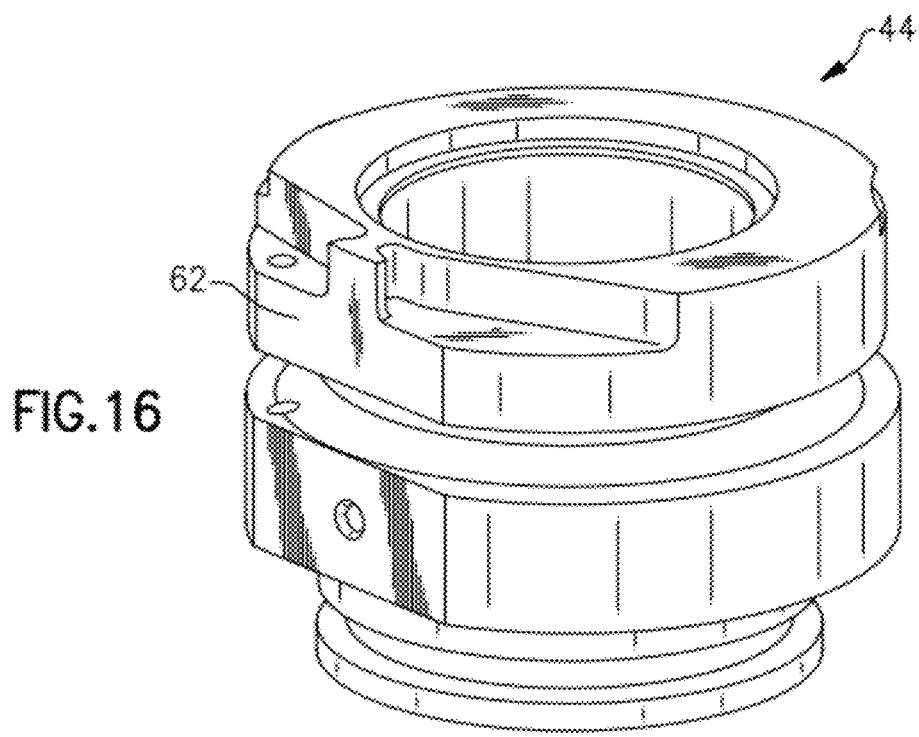
FIG. 16 is a perspective view of a main drive bearing.

With reference to FIG. 14, the main drive bearing 44 and the main driven bearing 46 abut along a respective interface surface, 62, 64 which defines the main stage bridge land geometry 60 and extends perpendicular to the interface surface 62, 64 (FIG. 16). The interface surface 62, 64 in the disclosed non-limiting embodiment is a flat surface.

Figure 17:
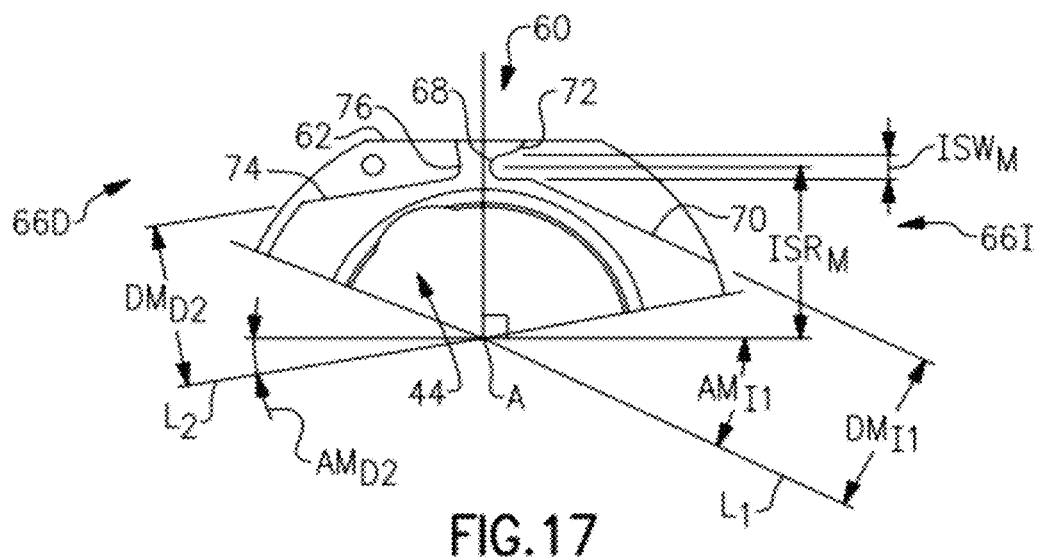
FIG. 17 is an enlarged end view of the main drive bearing to illustrate a main stage bridge land geometry according to the present disclosure.

With reference to FIG. 17, the main stage bridge land geometry 60 of the main drive bearing 44 defines a main drive inlet geometry 66I which receives and at least partially directs the flow from the main stage inlet MI with minimal cavitation. The main drive inlet geometry 66I includes a finger cut 68 generally recessed in the direction of inlet fluid flow and generally parallel to the interface surface 62. The finger cut 68 is located intermediate a first inlet surface 70 and a second inlet surface 72 which generally intersect within the finger cut 68. The first inlet surface 70 and the second inlet surface 72 define an angle equal or generally greater than 90 degrees.

In one disclosed non-limiting dimensional embodiment, the finger cut 68 defines a width $ISW_M$ of 0.060-0.160 inches (1.5-4.1 mm) and a nominal width of 0.110 inches (2.8 mm). The center of the finger cut 68 is displaced from the input shaft axis A a radial distance $ISR_M$ of 0.715-0.815 inches (18.2-20.7 mm) with a nominal distance of 0.765 inches (19.4 mm). In this disclosed non-limiting dimensional embodiment, a ratio of $ISW_M/ISR_M$ is defined between 0.074-0.224. The disclosed ratios facilitate the critical fluid interchange at the main stage gear mesh.

In one disclosed non-limiting dimensional embodiment, the first inlet surface 70 is displaced a distance $DM_{I1}$ of 0.623-0.823 inches (15.8-20.9 mm) from a line $L_1$ which is angled at an angle $AM_{I1}$ of 22 to 32 degrees from horizontal with a nominal distance $DM_{I1}$ of 0.723 inches (18.4 mm) at an angle $AM_{I1}$ of 27 degrees.

The main stage bridge land geometry 60 of the main drive bearing 44 also defines a main drive discharge geometry 66D which discharges and at least partially directs the flow into the main stage discharge MD with minimal cavitation. The main drive discharge geometry 66D includes a first discharge surface 74 and a second discharge surface 76 which generally intersect opposite the finger cut 68. The first discharge surface 74 and the second discharge surface 76 define an angle equal or generally greater than 90 degrees.

In one disclosed non-limiting dimensional embodiment, the first discharge surface 74 is displaced a distance $DM_{D2}$ of 0.623-0.823 inches (15.8-20.9 mm) from a line $L_2$ which is angled at an angle $AM_{D2}$ of 5 to 15 degrees from horizontal with a nominal distance $DM_{D2}$ of 0.723 inches (18.4 mm) at an angle $AM_{D2}$ of 10 degrees.

Figure 18:
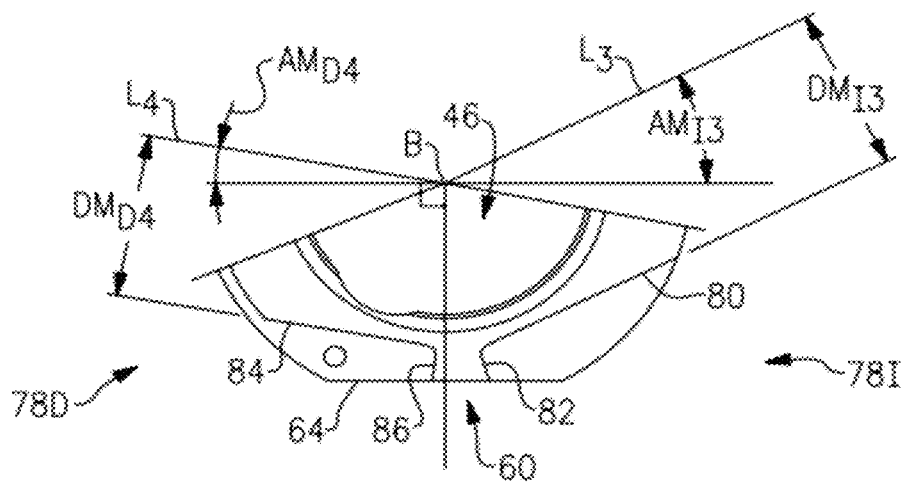
FIG. 18 is an enlarged end view of the main driven bearing to illustrate the main stage bridge land geometry according to the present disclosure.

With reference to FIG. 18, the main stage bridge land geometry 60 of the main driven bearing 46 includes main driven inlet geometry 78I which mates with the main drive inlet geometry 66I at the interface surfaces, 62, 64, and receives and at least partially directs the flow from the main stage inlet MI with minimal cavitation. The main driven inlet geometry 78I includes a first inlet surface 80 and a second inlet surface 82 which generally intersect. The first inlet surface 80 and the second inlet surface 82 define an angle equal or generally greater than 90 degrees.

In one disclosed non-limiting dimensional embodiment, the first inlet surface 80 of the main driven bearing 46 is displaced a distance $DM_{I3}$ of 0.623-0.823 inches (15.8-20.9 mm) from a line $L_3$ which is angled at an angle $AM_{I3}$ of 22 to 32 degrees from horizontal with a nominal distance $DM_{I3}$ of 0.723 inches (18.4 mm) at an angle $AM_{I3}$ of 27 degrees.

The main stage bridge land geometry 60 of the main driven bearing 46 also includes main driven discharge geometry 78D which mates with the main drive discharge geometry 66D at the interface surfaces, 62, 64, and discharges and at least partially directs the flow into the main stage discharge MD with minimal cavitation. The main driven discharge geometry 78D includes a first discharge surface 84 and a second discharge surface 86 which generally intersect and define an angle equal or generally greater than 90 degrees.

In the disclosed non-limiting dimensional embodiment, the first discharge surface 84 is displaced a distance $DM_{D4}$ of 0.623-0.823 inches (15.8-20.9 mm) from a line $L_4$ which is angled at an angle $AM_{D4}$ of 5 to 15 degrees from horizontal with a nominal distance $DM_{D4}$ of 0.723 inches (18.4 mm) at an angle $AM_{D4}$ of 10 degrees. That is, the first inlet surface 70 is geometrically equivalent to the first inlet surface 80 and the first discharge surface 74 is geometrically equivalent to the first discharge surface 84.

Motive Stage Bearing Geometry

As with the main stage 36, the motive stage 38 includes similar bearing face geometry nearest the motive stage gear mesh which is also referred to as the bridge land geometry. It should be understood that the disclosed geometry can be implemented in numerous other fluid systems.

Figure 19:
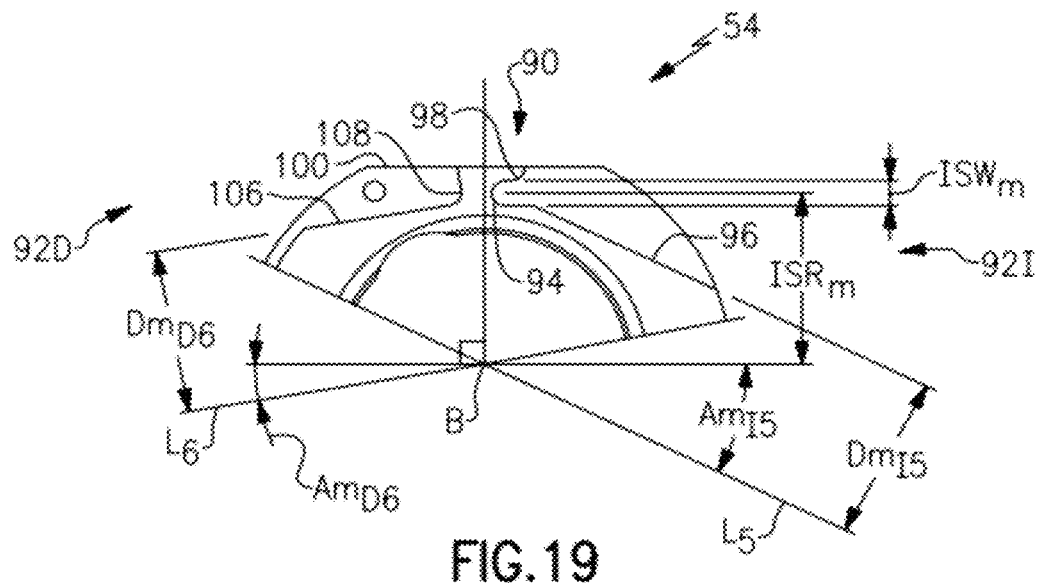
FIG. 19 is an enlarged end view of the motive drive bearing to illustrate a motive stage bridge land geometry according to the present disclosure.

With reference to FIG. 19, the motive stage bridge land geometry 90 of the motive drive bearing 54 defines a motive drive inlet geometry 92I which receives and at least partially directs the flow from the motive stage inlet mI with minimal cavitation. The motive drive inlet geometry 92I includes a finger cut 94 generally recessed in the direction of inlet fluid flow and generally parallel to an interface surface 100. The finger cut 94 is located intermediate a first inlet surface 96 and a second inlet surface 98 which generally intersect within the finger cut 94. The first inlet surface 96 and the second inlet surface 98 define an angle equal or generally greater than 90 degrees.

In one disclosed non-limiting dimensional embodiment, the finger cut 94 defines a width $ISW_m$ of 0.05-0.150 inches (1.3-3.8 mm) and a nominal width of 0.100 inches (2.5 mm). The center of the finger cut 94 is displaced from the input shaft axis B, a radial distance $ISR_m$ of 0.512-0.612 inches (13.0-15.5 mm) with a nominal distance of 0.562 inches (14.3 mm). In this disclosed non-limiting dimensional embodiment, a ratio of $ISW_m/ISR_m$ is defined between 0.082-0.293. The disclosed ratios facilitate the critical fluid interchange at the motive stage gear mesh.

In one disclosed non-limiting dimensional embodiment, the first inlet surface 96 is displaced a distance $Dm_{I5}$ of 0.416-0.616 inches (10.6-15.6 mm) from a line $L_5$ which is angled at an angle $Am_{I5}$ of 23 to 33 degrees from horizontal with a nominal distance $Dm_{I5}$ of 0.516 inches (13.1 mm) at an angle $Am_{I5}$ of 28 degrees.

The motive stage bridge land geometry 90 of the motive drive bearing 54 also defines a motive drive discharge geometry 92D which discharges and at least partially directs the flow into the motive stage discharge mD with minimal cavitation. The motive drive discharge geometry 92D includes a first discharge surface 106 and a second discharge surface 108 which generally intersect opposite the finger cut 94. The first discharge surface 106 and the second discharge surface 108 define an angle equal or generally greater than 90 degrees.

In one disclosed non-limiting dimensional embodiment, the first discharge surface 106 is displaced a distance $Dm_{D6}$ of 0.416-0.616 inches (10.6-15.6 mm) from a line $L_6$ which is angled at an angle $Am_{D6}$ of 6 to 16 degrees from horizontal with a nominal distance $Dm_{D6}$ of 0.516 inches (13.1 mm) at an angle $Am_{D6}$ of 11 degrees.

Figure 20:
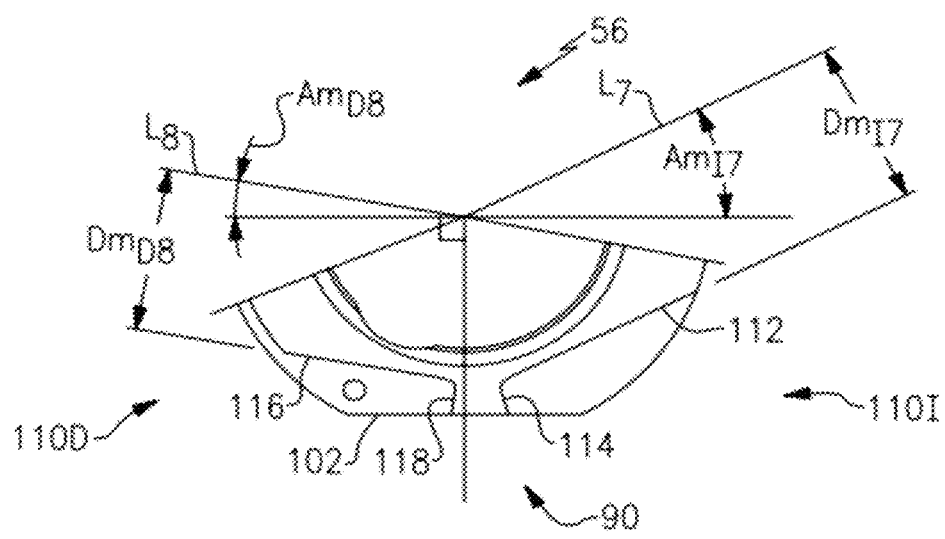
FIG. 20 is an enlarged end view of the motive driven bearing to illustrate the motive stage bridge land geometry according to the present disclosure.

With reference to FIG. 20, the motive stage bridge land geometry 90 of the motive driven bearing 56 includes motive driven inlet geometry 110I which mates with the motive drive inlet geometry 92I at the interface surfaces, 100, 102, and receives and at least partially directs the flow from the motive stage inlet mI with minimal cavitation. The motive driven inlet geometry 110I includes a first inlet surface 112 and a second inlet surface 114 which generally intersect. The first inlet surface 112 and the second inlet surface 114 define an angle equal or generally greater than 90 degrees.

In one disclosed non-limiting dimensional embodiment, the first inlet surface 112 of the motive driven bearing 56 is displaced a distance $Dm_{I7}$ of 0.416-0.616 inches (10.6-15.6 mm) from a line $L_7$ which is angled at angle $Am_{I7}$ of 23 to 33 degrees from horizontal with a nominal distance $Dm_{I7}$ of 0.516 inches (13.1 mm) at an angle $Am_{I7}$ of 28 degrees.

The motive stage bridge land geometry 90 of the motive driven bearing 56 also includes motive driven discharge geometry 110D which mates with the motive drive discharge geometry 92D at the interface surfaces, 100, 102, and discharges and at least partially directs the flow into the motive stage discharge mD with minimal cavitation. The motive driven discharge geometry 110D includes a first discharge surface 116 and a second discharge surface 118 which generally intersect and define an angle equal or generally greater than 90 degrees.

In the disclosed non-limiting dimensional embodiment, the first discharge surface 116 is displaced a distance $Dm_{D8}$ of 0.416-0.616 inches (10.6-15.6 mm) from a line $L_8$ which is angled at an angle $Am_{D8}$ of 6 to 16 degrees from horizontal with a nominal distance $Dm_{D8}$ of 0.516 inches (13.1 mm) at an angle $Am_{D8}$ of 11 degrees. That is, the first inlet surface 96 is geometrically equivalent to the first inlet surface 112 and the first discharge surface 106 is geometrically equivalent to the first discharge surface 116.

The main stage bridge land geometry 60 and the motive stage bridge land geometry 90 facilitate the critical fluid interchange at the gear mesh. Cavitation occurs when the local fluid pressure falls below the fluid's true vapor pressure and a fluid bubble forms, then a sudden increase in the local fluid pressure causes the bubble to violently collapse back into solution. When cavitation occurs on or near a solid surface, the high intensity collapse force or cavitation damage power, similar to a shockwave, can cause high surface stresses and lead to local deterioration of the surface, commonly described as pitting. This deterioration may eventually erode the gears, bearings, and housing components and decrease system performance. The fluid interchange at the gear mesh causes local fluid pressure changes and so the bearing face geometry is designed to keep the local fluid pressure as high as possible—preferably above the fluid's true vapor pressure—especially while the gear mesh zone is open to the inlet port, in order to minimize cavitation.

Pressure ripple, which is also caused by the fluid interchange at the gear mesh, increases and decreases the local fluid pressure, which can increase cavitation and may cause other detrimental effects to the system. Therefore, the disclosed main stage bridge land geometry 60 and the motive stage bridge land geometry 90 are also designed to minimize pressure ripple.

Using numerical calculations and computational fluid dynamics (CFD) analytical software, the entire bearing face geometry was analyzed and defined, where the specific gear set, housing passageways, and other system component geometries were all used as part of the analysis. Based on the specific performance requirements, the bearing face geometry is optimized to minimize cavitation and pressure ripple over the entire operating range as well as meet all other requirements. In addition, the bearing face geometry is designed to facilitate manufacturing of its features, which reduces the bearing manufacturing costs.

The specific bearing face geometry, which is matched to the specific gear set, housing passageways, and other system component geometries, optimizes pump performance while minimizing cavitation and pressure ripple in the fuel system. This will reduce deterioration of the gears, bearings, housings, and other system components, thus maintaining pump and system performance and increasing component operating life. The minimized pressure ripple and cavitation damage power intensity will create a more stable fuel system that can be more easily and accurately monitored and controlled.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A bearing comprising:
   a bridge land geometry having a finger cut that defines a width ISW, a center of said width ISW displaced from an axis a radial distance ISR, a ratio of ISW/ISR between 0.074-0.293.

2. The bearing as recited in claim 1, wherein said ratio of ISW/ISR is between 0.074-0.224.

3. The bearing as recited in claim 1, wherein said ratio of ISW/ISR is between 0.082-0.293.

4. The bearing as recited in claim 1, wherein said width ISW is between 0.060-0.160 inches (1.5-4.1 mm).

5. The bearing as recited in claim 1, wherein said width ISW is a nominal width of 0.110 inches (2.8 mm).

6. The bearing as recited in claim 1, wherein said width ISW is between 0.05-0.150 inches (1.3-3.8 mm).

7. The bearing as recited in claim 1, wherein said width ISW is a nominal width of 0.100 inches (2.5 mm).

8. The bearing as recited in claim 1, wherein said finger cut is generally parallel to an interface surface at which a second bearing abuts said bearing.

9. The bearing as recited in claim 1, wherein said finger cut is located intermediate a first inlet surface and a second inlet surface which generally intersect within said finger cut.

10. The bearing as recited in claim 1, wherein said ratio of ISW/ISR between 0.074-0.293 is selected with respect to influencing fluid interchange at a gear mesh to maintain localized fluid pressure.

11. The bearing as recited in claim 1, wherein said finger cut is located intermediate a first inlet surface and a second inlet surface that define an angle that is equal to or greater than 90 degrees.

12. The bearing as recited in claim 11, further comprising a first discharge surface and a second discharge surface that intersect opposite said finger cut, said first discharge surface and said second discharge surface defining an angle that is equal to or greater than 90 degrees.

13. A gear pump comprising:
    a first shaft which extends along a first axis;
    a first gear mounted to said first shaft along said first axis; and
    a first bearing which supports said first gear, said first bearing having a first bridge land geometry with a finger cut that defines a width ISW, a center of said width ISW displaced from said first axis a radial distance ISR, a ratio of ISW/ISR between 0.074-0.293.

14. The gear pump as recited in claim 13, further comprising:
    a second shaft which extends along a second axis parallel to said first axis;
    a second gear mounted to said second shaft along said second axis, said second gear in meshed engagement with said first gear; and
    a second bearing which supports said second gear, said second bearing having a second bridge land geometry adjacent to said first bridge land geometry.

15. The gear pump as recited in claim 14, further comprising an inlet surface in said first bearing and an inlet surface in said second bearing, said inlet surface in said first bearing geometrically arranged the same as said inlet surface in said second bearing.

16. The gear pump as recited in claim 14, further comprising an inlet surface in said first bearing and an inlet surface in said second bearing, said inlet surface in said first bearing and said inlet surface in said second bearing arranged at an equivalent angle.

17. The gear pump as recited in claim 16, further comprising a discharge surface in said first bearing and a discharge surface in said second bearing, said discharge surface in said first bearing and said discharge surface in said second bearing arranged at an equivalent angle.

18. The gear pump as recited in claim 14, wherein said first bearing is in contact with said second bearing at interface surface to define a "figure 8".

19. The gear pump as recited in claim 13, wherein said ratio of ISW/ISR between 0.074-0.293 is selected with respect to influencing fluid interchange at a gear mesh of said first gear to maintain localized fluid pressure.

20. A method of installing a gear within a gear pump comprising:
    supporting a first gear with a first bearing along an axis, the first bearing having a first bridge land geometry with a finger cut that defines a width ISW, a center of the width ISW displaced from the axis a radial distance ISR, a ratio of ISW/ISR between 0.074-0.293.

21. The method as recited in claim 20, further comprising:
    supporting the first gear with a second bearing along the axis, the second bearing having a second bridge land geometry with a finger cut that defines a width ISW, a center of the width ISW displaced from the axis a radial distance ISR, a ratio of ISW/ISR between 0.074-0.293.

22. The method as recited in claim 21, further comprising:
    mating bearing faces of the first bearing and the second bearing to opposite axial end faces of the first gear.

23. The method as recited in claim 20, wherein said ratio of ISW/ISR between 0.074-0.293 is selected with respect to influencing fluid interchange at a gear mesh of said first gear to maintain localized fluid pressure.

* * * * *